July 13, 1943. E. W. RIEMENSCHNEIDER 2,324,026
TUBE CORRUGATING APPARATUS
Filed Nov. 8, 1940. 5 Sheets-Sheet 2
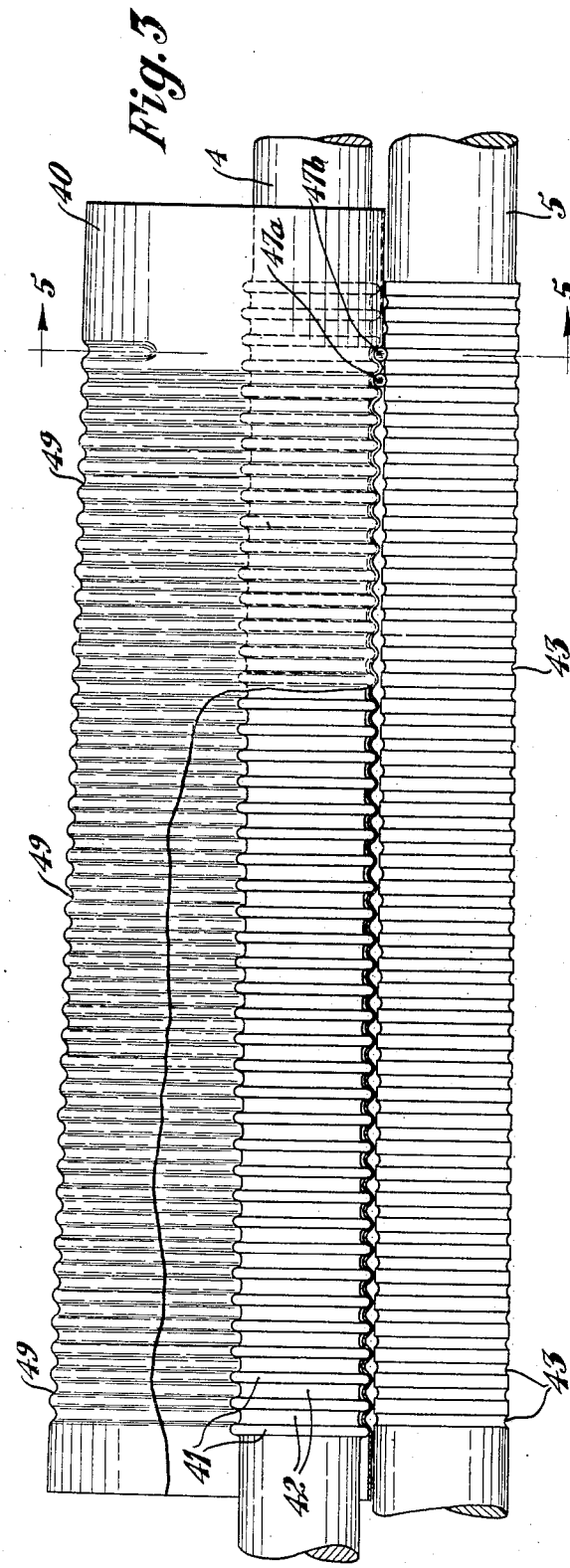
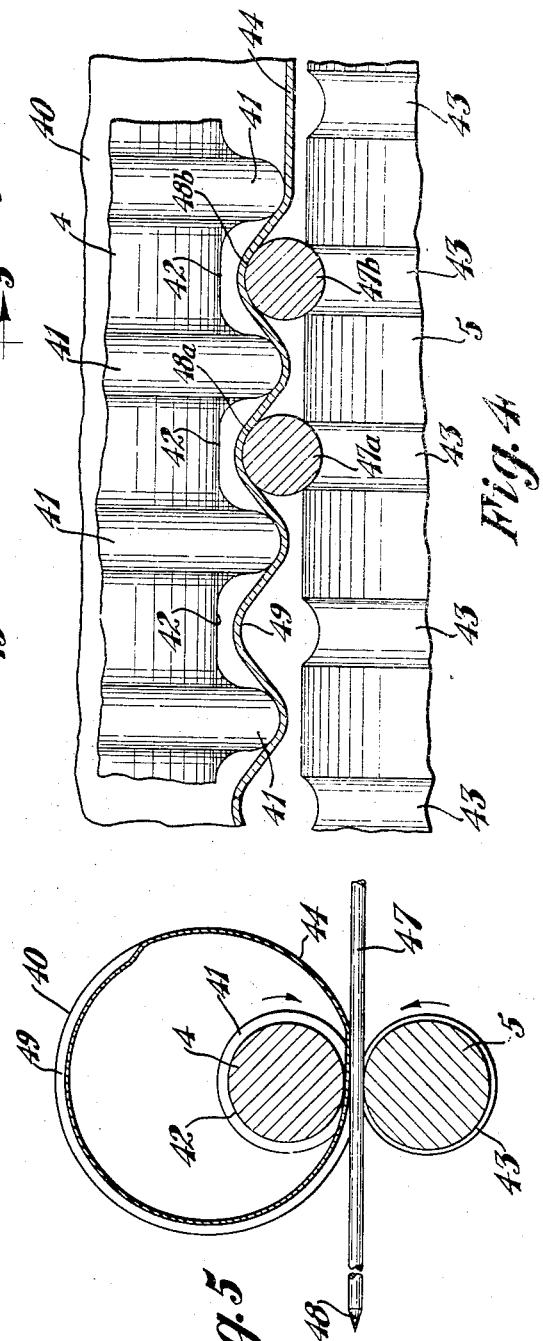
Inventor
Edmund W. Riemenschneider
By Fraser and Bishop
Attorneys

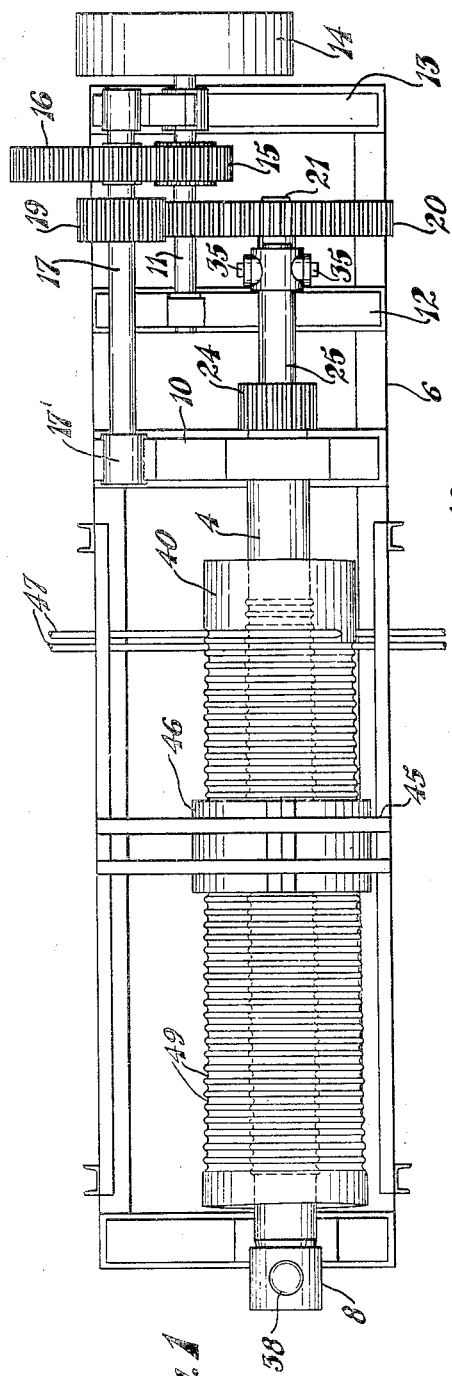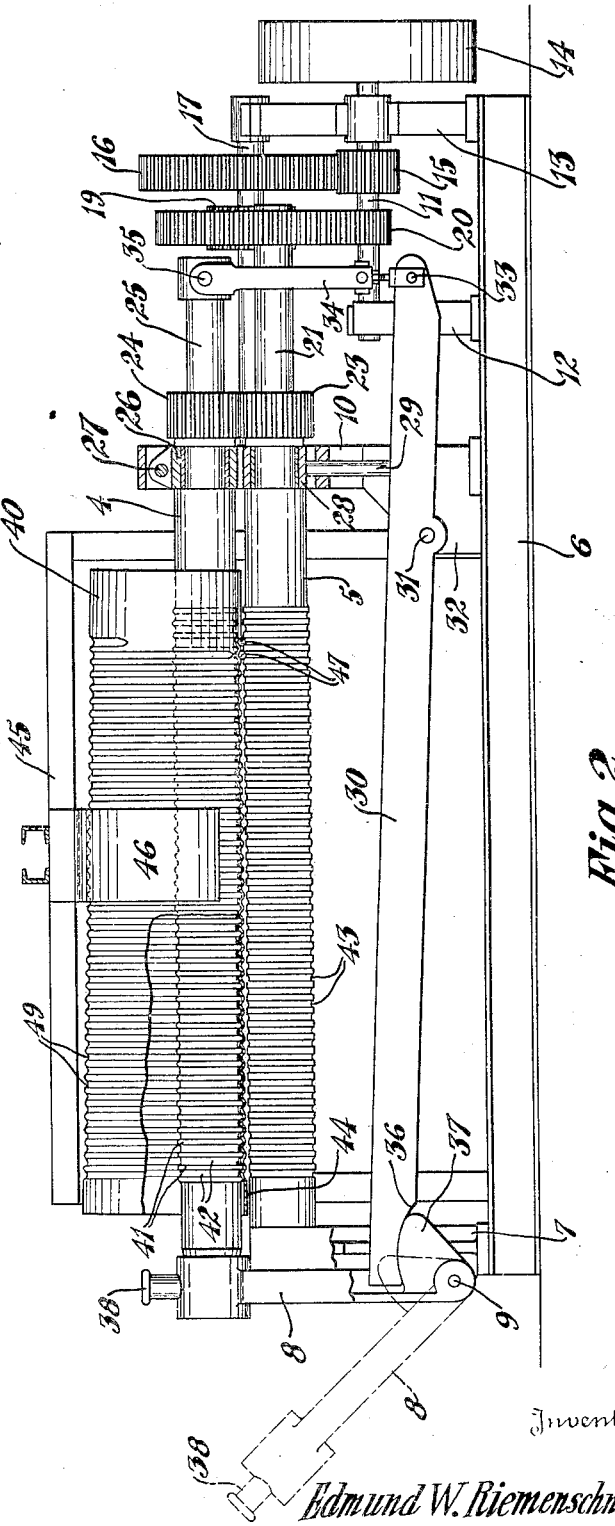

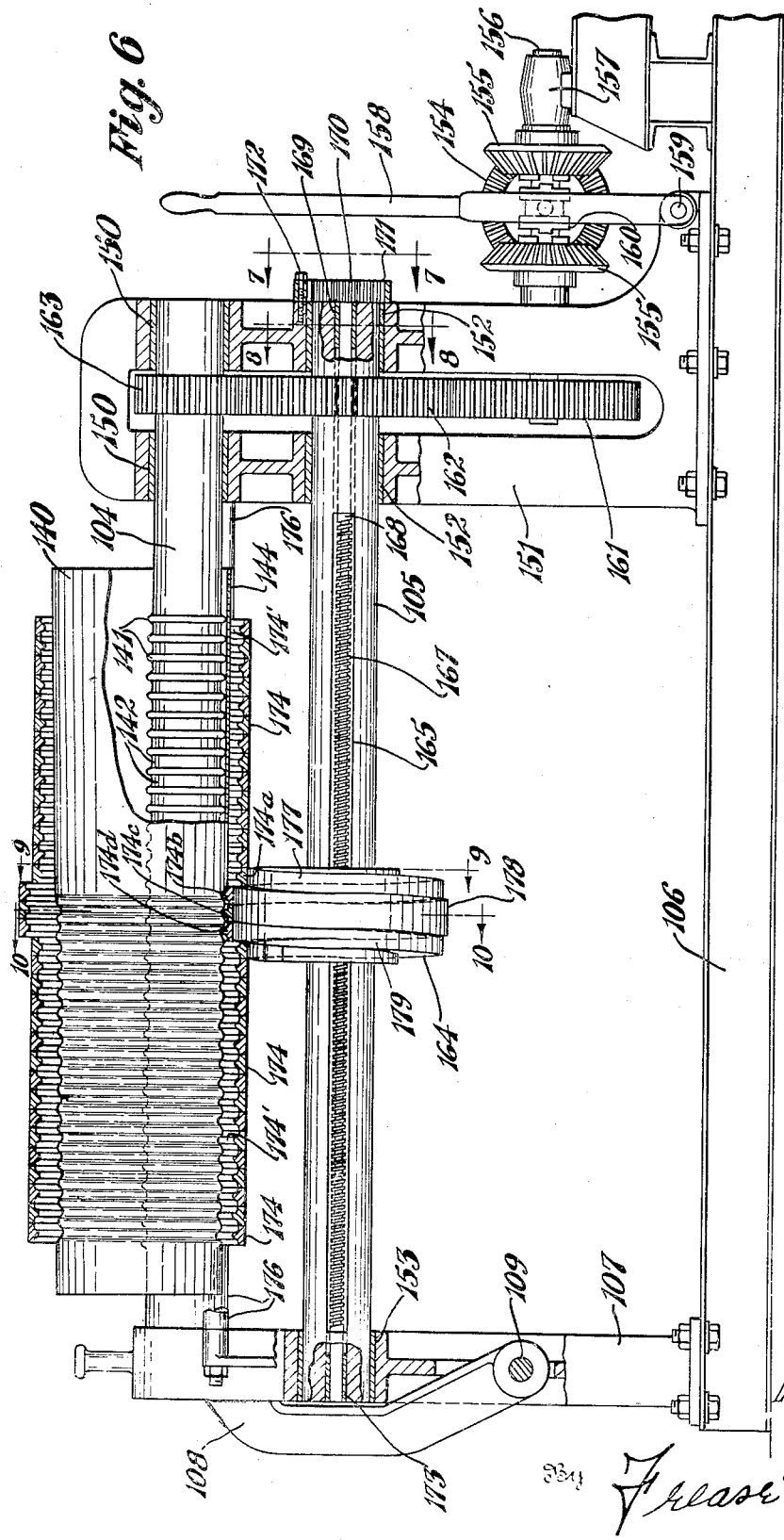

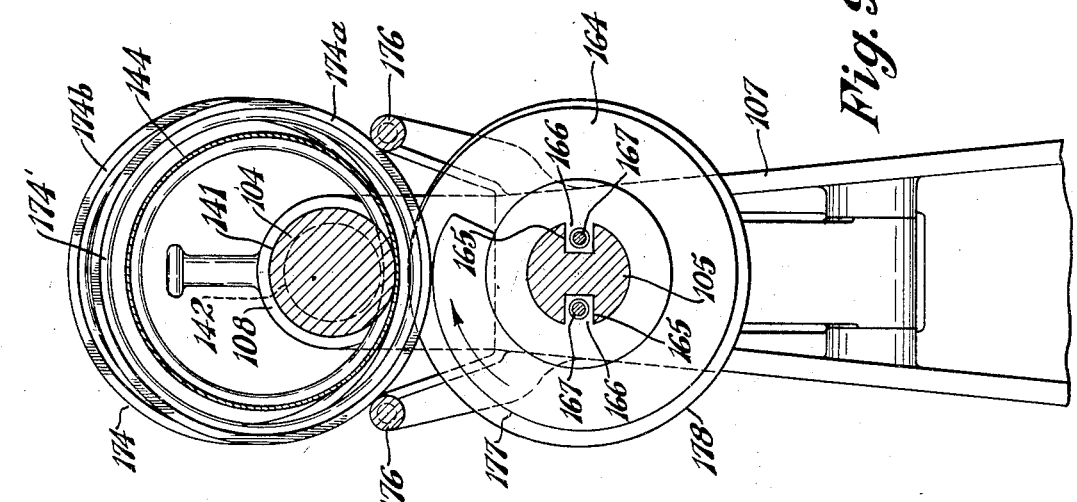

Patented July 13, 1943

2,324,026

UNITED STATES PATENT OFFICE 2,324,026

TUBE CORRUGATING APPARATUS

Edmund W. Riemenschneider, Canton, Ohio, assignor to The Union Metal Manufacturing Company, Canton, Ohio, a corporation of Ohio Application November 8, 1940, Serial No. 364,859

9 Claims. (Cl. 153—73)

The invention relates generally to apparatus for forming circumferential corrugations in thin walled metal tubes, and more particularly to apparatus for forming relatively deep corrugations in cylindrical or tapered tubes used for conduits or foundation piles and the like.

In the past, tubes have been corrugated by using bending rolls for simultaneously forming circumferential corrugations throughout the length of the tube, but the depth of such corrugations is limited to the amount of stretching the metal of the tube will stand at each corrugation without rupture or weakening, and accordingly the corrugations which can be formed by such bending rolls are relatively shallow.

It is obvious that the deeper the corrugations can be formed without weakening the metal of the tube, the stronger will be the tube.

Certain prior apparatus have employed a pair of rotating roll dies for forming a spiral corrugation or screw thread in the wall of a pipe by moving the pipe longitudinally through the dies, but such apparatus cannot function to form a spiral corrugation in a tapered tube, because to do so would require the longitudinal speed of the tube to change for every convolution of the corrugations.

Certain other prior apparatus have included a circumferentially grooved mandrel on and around which the cylinder to be corrugated is supported, with a rotating embossing tool traveling along the cylinder and rolling the cylinder wall into the grooves of the mandrel. However, said embossing tool necessarily has a plurality of teeth or ribs which are spirally disposed and are required to mesh with and follow the non-spiral grooves of the mandrel, tending to distort and stretch the metal of the cylinder at the corrugations. Moreover, if it is attempted to corrugate a tapered tube with this apparatus, the ends of the corrugations as they are formed during each rotation of the tube will not register accurately with the beginnings of said corrugations formed during the same rotation of the tube.

Accordingly, it is a general object of the present invention to provide a novel and improved apparatus for forming circumferential corrugations in cylindrical and tapered tubes.

More specifically, it is an object of the present invention to provide an improved apparatus for forming relatively deep circumferential corrugations in cylindrical or tapered tubes without materially stretching the metal of the tube at the corrugations to cause weakening of the metal.

Another object is to provide improved apparatus for forming deep circular corrugations throughout substantially the entire length of thin walled metal tubes.

A further object is to provide improved tube corrugating apparatus for forming circular corrugations successively one at a time throughout the length of a thin walled metal tube.

Another object is to provide an improved tube corrugating apparatus which is adapted to corrugate cylindrical and tapered tubes over a wide range of tube diameters.

A still further object is to provide novel and improved tube corrugating apparatus which accomplishes all of the foregoing objects and which is simple and inexpensive to construct and to operate.

These objects, and others which will become apparent from the accompanying drawings and following description, are accomplished by the improvements comprising the present invention, which is comprehended in the combinations of elements, together with their reasonable mechanical equivalents, as defined in the appended claims.

In general terms the present invention may be stated as including tube corrugating apparatus having a circumferentially grooved rotating mandrel around which the tube to be corrugated is supported, and a plurality of corrugation forming members one positioned opposite each groove in the mandrel and adapted to be successively engaged with the tube to form corrugations therein.

In the drawings forming part hereof, in which preferred embodiments of the invention are shown by way of example, Figure 1 is a plan view of one embodiment of the improved corrugating apparatus, showing a tapered tube in position for being corrugated, using straight rods as the corrugation forming members;

Fig. 2 is a side elevation thereof, parts being broken away and in section;

Fig. 3 is an enlarged fragmentary side elevation thereof showing only the tube, the rotating rolls and the straight rods for forming the corrugations in the tube wall;

Fig. 4 is a still further enlarged fragmentary view thereof;

Fig. 5 is a transverse sectional view taken on line 5—5, Fig. 3;

Fig. 6 is a side elevation partly in section, of another embodiment of the improved corrugating apparatus;

Fig. 7 is an enlarged fragmentary end elevation as on line 7—7, Fig. 6;

Fig. 8 is an enlarged fragmentary transverse sectional view as on line 8—8, Fig. 6;

Fig. 9 is an enlarged transverse sectional view as on line 9—9, Fig. 6;

Fig. 10 is a similar view as on line 10—10, Fig. 6;

Fig. 11 is a similar view of a slightly different form of the improved apparatus.

Similar numerals refer to similar parts throughout the drawings.

Figure 12:
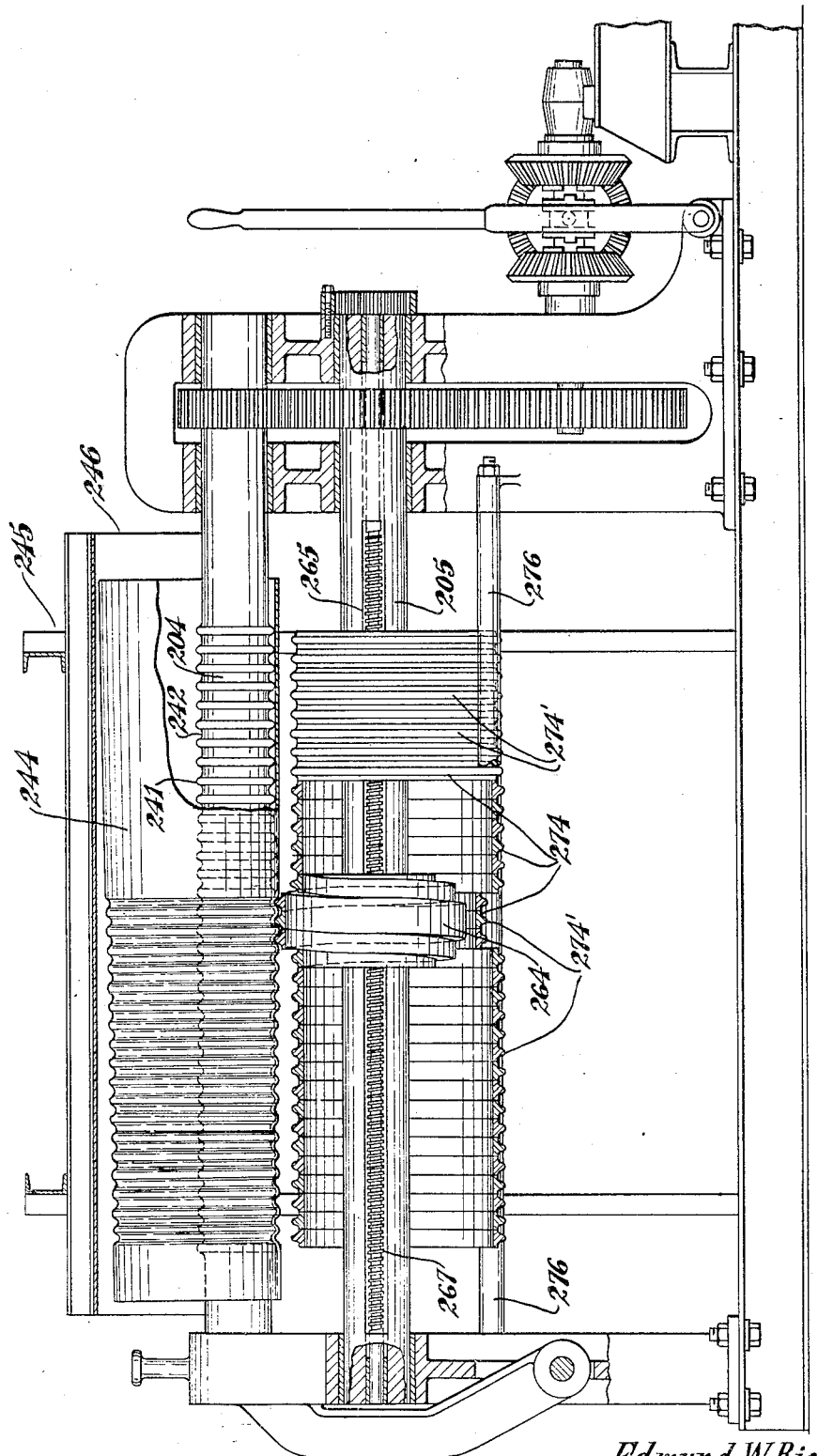
Fig. 12 is a side elevation partly in section, of the embodiment shown in Fig. 11.

Referring first to the embodiment of the invention illustrated in Figs 1 to 5 inclusive a pair of rolls 4 and 5 are journaled one above the other in suitable bearing brackets supported on a base 6. The front end of the lower roll 5 is journaled in a bearing bracket 7 supported on the front end of the base, and the front end of the upper roll 4 is journaled in a swingable bearing bracket 8 which is pivoted on the bracket 7 at 9. The rear ends of the rolls 4 and 5 are journaled in a longitudinally spaced bearing bracket 10 supported on the base.

Means for driving the rolls preferably includes a drive shaft 11 journaled in longitudinally spaced brackets 12 and 13 on the rear end of the base and having a drive pulley 14 on its rear projecting end, for being driven from any suitable source of power. A pinion 15 on the drive shaft 13 meshes with a gear 16 on a laterally spaced shaft 17 journaled in the bearing bracket 13 at one end and extending longitudinally of the base over the bracket 12, the other end of shaft 17 being journaled in a bearing 17' mounted in the side of bearing bracket 10.

A pinion 19 on shaft 17 meshes with a gear 20 secured on the end of the shaft 21 of lower roll 5 for driving the same, and a pinion 23 on roll shaft 21 meshes with a pinion 24 of the same diameter and same number of teeth on the shaft 25 of the upper roll 4 for driving it at the same speed as roll 5 but in the opposite direction.

The shaft 25 of the upper roll 4 is journaled in a bearing 26 which is pivotally mounted in the bearing bracket 10 as at 27, and the shaft 21 of the lower roll 5 is journaled in a bearing 28 which is vertically movable in the bearing bracket 10, being supported by a post 29 carried on a longitudinally extending lever 30 which is pivoted at 31 on a plate 32 secured to the bracket 10. The lever 30 has its rear end pivoted at 33 to a yoke 34 the arms of which extend upwardly and straddle the lower roll shaft 21. The upper ends of the arms of yoke 34 are pivoted to studs 35 projecting laterally from opposite sides of the end of the upper roll shaft 25.

The front end of lever 30 is provided on its under side with a cam surface 36 which is slidably engaged by a cam 37 on the lower end of the swingable bearing 8 in the top of which the front end of upper roll 4 is journaled.

When it is desired to raise the front end of the upper roll shaft 4 the swingable bearing 8 is grasped at the handle portion 38 and swung downwardly and outwardly about the pivot 9, as indicated by the dot-dash position in Fig. 2. This movement causes cam 37 to raise the front end of lever 30 about its pivot 31, and the rear end of the lever to move downwardly and allow the bearing 28 to move the rear end of roll 5 downwardly an amount sufficient to disengage the pinion gear 23 from the pinion gear 24. At the same time, the downward movement of the rear end of lever 30 causes the yoke 34 to pull downwardly on the rear end of roll shaft 25 and swing the roll 4 about the pivot 27 to raise the front end of the roll. In this position a tube 40 to be corrugated can be slid over the upper roll or mandrel 4, after which the upper roll is lowered to position by returning the swingable bearing 8 to its full line position shown in Figs. 1 and 2, in which position the axes of the rolls are fixed when they are rotated to form corrugations.

The parts thus far described are conventional and per se form no part of the present invention.

The upper roll 4 is provided throughout the major portion of its length intermediate its journaled ends with a series of circular ribs 41 at longitudinal intervals and forming transverse grooves 42 therebetween. The lower roll 5 is provided throughout the major portion of its length intermediate its journaled ends with a series of circular transverse grooves 43 at longitudinal intervals, and as best shown in Fig. 4 the grooves 43 are positioned opposite the grooves 42 in roll 4.

The bearings for journaling the roll are positioned so that, in the closed position of the rolls, the space between the ribs of upper roll 4 and the outer surface of roll 5 is substantially greater than the thickness of the thin metal wall 44 of tube 40, and the tube is therefore not rolled or formed by the rolls themselves without the use of separate corrugation forming means.

The tube 40 as shown is a tapered tube with its larger end at the front end of the machine, although the machine is equally well adapted for forming corrugations on straight cylindrical tubes. The maximum length of the tube being corrugated is determined by and is slightly longer than the corrugated or grooved portions of the rolls. The diameter of the tube being corrugated can vary from a smallest diameter slightly larger than the upper roll 4 to a largest diameter which will fit under the super structure 45 supported on the base of the apparatus.

Means for centering the tube 40 during the corrugating operation may include a cylindrically shaped guide 46 engirdling the tube and suspended from the super structure 45.

In the corrugating operation, the rolls 4 and 5 are driven in opposite directions as indicated by the arrows in Fig. 5, and beginning at one end or the other of the corrugated portions of the rolls a series of die elements comprising straight rods 47 are inserted one at a time under the tube wall 44 and in the successive grooves 43 of the lower roll which engage and feed the rods each in the plane of a mating groove 42 in roll 4 and between the tube and lower roll 5. The operation can be started from either end of the tube and is shown in the drawings as progressing from left to right. The rods 47 are movable only in fixed planes transversely of the tube, that is, each rod moves in a transverse plane determined by a pair of registering grooves 42 and 43

As the first rod passes through the rolls it drives or rotates the tube on the upper roll and forces the tube wall toward the upper roll between the first two ribs 41 thereof to roll form a circular corrugation 49 in the tube wall. The ribs 41 interiorly support or back up the tube wall at longitudinally spaced zones between the grooves 42 along the longitudinal side of the tube adjacent the lower wall 5. Preferably, the rods are pointed as shown at 48 to facilitate their insertion between the rolls and are of sufficient length so that the tube will make at least two revolutions while one rod is passing through the rolls. After the tube has made one complete revolution to form the first corrugation, the next rod is inserted in the next adjacent groove 43 and while this second rod is forming the second corrugation, the first rod holds the first corrugation in shape and irons and smooths it during the second revolution of the roll. As the first rod completes its passage between the rolls, the second rod 47 has only partially completed its passage, so that when the third rod is inserted in the next adjacent groove the second rod will hold and iron the second corrugation as the third corrugation is formed.

This operation is continued to form successive corrugations throughout the length of the portion of the tube to be corrugated, so that there are always two rods passing through the rolls, one of which is forming a corrugation and the other of which is holding the corrugation just formed in shape. In Fig. 4 the rod indicated at 47a is holding the corrugation indicated at 48a in shape while the rod indicated at 47b is forming the corrugation indicated at 48b.

Accordingly, as each corrugation is formed the bending and forming of the tube wall at the corrugation is accompanied by a contraction in the length of the uncorrugated part of the tube, so that the metal between the corrugating ribs on opposite sides of the corrugation is merely bent and rolled into shape without any excessive stretching or distortion. Thus the corrugations formed in the embodiment of the improved apparatus shown in Figs. 1 to 5 can be made relatively deep without weakening the metal at the corrugations.

Obviously, since only one corrugation is formed at a time the corrugations can be formed as easily in a tapered tube as in a straight cylindrical tube.

In the embodiment of the invention illustrated in Figs. 6 to 10 inclusive an upper roll 104 is journaled at its rear end in spaced bearings 150 mounted in a bearing support 151 carried on the base 106, and the front end of roll 104 is journaled in a swingable bearing bracket 108 which is pivoted at 109 on a bearing bracket 107 carried on the front end of the base.

The lower roll 105 is spaced below the upper roll 104 and has its rear end journaled in spaced bearings 152 mounted in the bearing support 151, and its front end journaled in a bearing 153 mounted in the front bearing bracket 107.

Means for driving the rolls 104 and 105 in opposite directions preferably includes a bevel gear 154 which is driven from any suitable source of power, and which meshes with bevel gears 155 journaled on the drive shaft 156 which is journaled at one end in the bearing 157 supported on the base and at the other end in the bearing support 151. Clutch means for driving the shaft 156 in either direction preferably includes a clutch lever 158 which is pivoted at its bottom end at 159 on the bearing support 151 and connected intermediate its ends to the clutch member 160 which is keyed on shaft 156, for moving the clutch member in opposite directions to engage one or the other of the bevel gears 155 for driving the shaft 156 in opposite directions.

The front end of the drive shaft 156 within the bearing support 151 has a gear 161 thereon which meshes with a gear 162 between bearings 152 and secured on the roll 105 to drive the same. The gear 162 meshes with a gear 163 between bearings 150 and secured on the upper roll for driving the upper roll in the opposite direction. As shown the gear 163 is smaller than the gear 162 in order to drive the roll 104 at greater speed than the roll 105, for reasons hereinafter described.

The lower roll 105 has a cam member 164 mounted thereon for rotating with the roll and moving longitudinally thereon at the same time. Preferably, the roll 105 has diametrically opposite longitudinal slots or keyways 165 formed therein and extending between the bearings 152 and 153, and the cam member 164 is provided with internal keys 166 which slidably fit in said slots or keyways 165 to key the roll 105 and the cam 164 together. Means for causing the cam member 164 to move longitudinally along the roll shaft 105 as the cam member and roll rotate preferably includes screws 167 located in the slots 165 of the roll and screwed through the keys 166 of the cam member so that rotation of the screws 167 relative to the roll 105 will cause the cam member 164 to travel longitudinally along the roll 105. The screws are driven from roll 105 preferably as shown in Fig. 7 by extending the screw shafts 168 through the rear end of the roll 105 in which they are journaled in suitable bearings as indicated at 169, and by securing on their projecting ends pinion gears 170 which mesh with a ring gear 171 secured on the bearing support 151 as by bolts 172.

Thus as the roll 105 is rotated and with it the cam member 164, the pinions 170 mesh with the ring gear 171 to rotate the screws 167 about their axes and move the cam member 164 longitudinally along the roll 105. As shown, the front ends of the screws 167 are journaled in suitable bearings 173 in the front end of the roll 105 within the bearing 153.

The tube 140 to be corrugated is positioned around the upper roll or mandrel 104 which has a series of circular ribs 141 thereon, and the corrugating means in this embodiment preferably includes a series of die elements comprising rings 174 which engirdle the tube 140 and which are provided on their inner peripheries with corrugating ribs 174' for engaging the tube wall 144 to bend it upwardly between adjacent ribs 141 on the upper roll. The corrugation forming rings 174 are normally held in position, with each ring opposite a mating groove 142, around and spaced somewhat below the upper roll 104 by means of longitudinally extending supporting rods 176 on opposite sides of the roll 104 and having their front ends supported on the bearing bracket 107 and their rear ends supported on the bearing support 151. Thus when the swingable bearing bracket 108 is swung away from the roll 104 the tube 140 can be slid over the roll 104 between the roll and the rings 174.

In forming corrugations on the tapered tube 140, assuming that the cam member 164 is at the front end of the series of rings 174, when the rolls 104 and 105 are rotated the recessed helical portion 177 on the rear side of the cam will engage under the first ring 174 in the manner indicated in Fig. 9, and as the cam makes one rotation the ring moves onto the outer helical cam surface 178, which will feed and force the ring against the tube wall 144 and the tube wall against roll 104 to drive the tube with roll 104 and roll form a circular corrugation in the tube wall at a mating groove 142 between adjacent ribs 141, as the ring and cam rotate. The size of gear 163 on the roll 104 is calculated to drive the roll at a peripheral speed substantially equal to the speed of rotation of the tube 140 and the ring 174 driving the tube, so that there will be substantially no slippage between the rings 174 and the tube 140.

The width of the cam member 164 and the helical length of its exterior surface 178 is such that each ring 174 holds the tube wall against the upper roll 104 for at least two revolutions thereof, so that the first ring follows the corrugation already formed thereby during the second rotation of the tube and holds said first corrugation in shape while the second ring is forming the second corrugation.

In Figs. 6, 9 and 10 the cam is shown in a position in which the recessed cam portion 177 has just engaged ring 174a and on one further rotation of the cam the outer cam surface 178 will move the ring 174a upwardly to engage and form the tube wall 144. The ring 174b which is beginning to form a corrugation 148 is just starting to ride on the outer cam surface 178, and the ring 174c is also riding on said outer cam surface and has completed one revolution, while ring 174d has completed two revolutions and is about to ride off the front end of cam surface 178 onto recessed portion 179 as the ring 174a begins to engage recessed portion 177.

The recessed helical portion 179 on the front side of cam 164 is reversely formed with respect to the recessed portion 177 on its rear side, so that the tube can be corrugated progressing from the rear of the machine toward the front by starting the cam member at the rear end of the series of rings 174, and moving it forwardly to successively move the rings into corrugation forming engagement with the tube 140.

The embodiment of the invention shown in Figs. 11 and 12, is generally similar to the form shown in Figs. 6 to 10 inclusive, including an upper roll 204 or mandrel having circular ribs 241 thereon, and a lower roll 205 having a cam member 264 mounted thereon for rotating with the roll and simultaneously moving longitudinally thereon. The cam member 264 has internal keys 266 slidably fitting in keyways 265 in the roll 205, and axially rotating screws 267 for moving the cam member 264 along the roll as it rotates.

However, in the embodiment of Figs. 11 and 12 the corrugation forming rings 274 engirdle the lower roll 205 and are somewhat larger than the cam member 264 so that the cam member will engage the inner circumference of the rings to move them upwardly in engagement with the tube wall 244 to form the corrugations. Accordingly the corrugating ribs 274' on the rings are on the outer circumference thereof.

As shown in Figs. 11 and 12, rods 276 extend longitudinally of the roll 205 on opposite sides thereof for supporting the rings 274 when not being engaged by the cam member 264, and a cylindrically shaped guide 246 is suspended from super structure 245 and engirdles the tube 240 for centering the tube during the corrugating operation.

Obviously, in both the embodiments of Figs. 6 through 10 and Figs. 11 and 12, instead of using circular rings with inner or outer rounded ribs 174' or 274' for engaging the tube wall, rings or die elements of circular cross section could be used to form the corrugations by providing spacing means between the rings of circular cross section to properly space them longitudinally. Also, the rings 174 and 274 are movable only in fixed planes transversely of the tube, that is, each ring moves in the plane of one of the grooves in the mandrel 104 or 204.

The several embodiments of the present invention provide improved apparatus for forming relatively deep circular corrugations in cylindrical or tapered tubes over a wide range of tube sizes without weakening the tube metal at the corrugations.

I claim:

1. Apparatus for forming relatively deep circular corrugations in tubes, including an upper grooved mandrel roll around which the tube is positioned, a lower roll having grooves opposite the grooves in the upper roll, means for driving the rolls in opposite directions, and a plurality of rods adapted for being successively passed between the tube wall and lower roll in the lower roll grooves for successively rolling the tube wall into the grooves of the upper roll to form circular corrugations in the tube, said lower roll grooves being adapted for moving the rods between the tube and the lower roll when the rolls rotate.

2. Apparatus for forming relatively deep circular corrugations in tubes, including an upper grooved mandrel roll around which the tube is positioned, guide means for centering the tube, a lower roll having grooves opposite the grooves in the upper roll, means for driving the rolls in opposite directions, and a plurality of rods adapted for being successively passed between the tube wall and lower roll in the lower roll grooves for successively rolling the tube wall into the grooves of the upper roll to form circular corrugations in the tube, said lower roll grooves being adapted for moving the rods between the tube and the lower roll when the rolls rotate.

3. Apparatus for forming relatively deep circular corrugations in tubes, including an upper grooved mandrel roll around which the tube is positioned, a lower roll spaced from said upper roll, means for driving the rolls in opposite directions, a plurality of rings positioned around one of said rolls opposite the grooves in said upper roll, and means on and operatively connected to the lower roll for successively rolling said rings against the wall of the tube for rolling the tube wall into successive grooves in the upper roll.

4. Apparatus for forming relatively deep circular corrugations in tubes, including an upper grooved mandrel roll around which the tube is positioned, a lower roll spaced from said upper roll, means for driving the rolls in opposite directions, a series of rings positioned around one of said rolls one opposite each groove in the upper roll, and means including a cam mounted on and operatively connected to the lower roll for successively forcing said rings into rolling engagement with said tube wall.

5. Apparatus for forming relatively deep circular corrugations in tubes, including an upper grooved mandrel roll around which the tube is positioned, a lower roll spaced from said upper roll, means for driving the rolls in opposite directions, a plurality of rings positioned around the upper roll one opposite each groove in the upper roll, ring driving means longitudinally movable on and rotatable with said lower roll, and means moving said ring driving means longitudinally on said lower roll for successively rolling said rings against the wall of the tube and forming the same in the successive grooves of the upper roll.

6. Apparatus for forming relatively deep circular corrugations in tubes, including an upper grooved mandrel roll around which the tube is positioned, a lower roll spaced from said upper roll, means for driving the rolls in opposite directions, a series of rings positioned around one of said rolls one opposite each groove in the upper roll, and means on and operatively connected to the lower roll for successively moving said rings into rolling engagement with said tube to form circular corrugations therein, said means being adapted for holding each ring in corrugation forming engagement with said tube for at least two revolutions thereof and to move the next adjacent ring into corrugation forming engagement with the tube substantially at the beginning of the second revolution in engagement with said first ring.

7. Apparatus for forming relatively deep circular corrugations in tubes, including an upper grooved mandrel roll around which the tube is positioned, a lower roll spaced entirely below said upper roll, means for driving the rolls in opposite directions, a series of corrugation forming rings, means supporting said rings around one of said rolls with each of said rings opposite one of the grooves in said upper roll, cam means movable longitudinally on and rotatable with said lower roll for successively raising said rings to roll form the wall of said tube into successive grooves of the upper roll, and means operatively connected to said lower roll for moving said cam means longitudinally thereon.

8. Apparatus for forming relatively deep circular corrugations in tubes, including an upper grooved mandrel roll around which the tube is positioned, a lower roll spaced from said upper roll, means for driving the rolls in opposite directions, a series of corrugation forming rings, means supporting said rings around said lower roll with each of said rings opposite one of the grooves in said upper roll, cam means movable longitudinally on and rotatable with said lower roll, and means moving said cam means longitudinally on said lower roll for engaging the interior of said rings successively to move the same into engagement with the tube to roll form the same into the successive grooves in the upper roll.

9. Apparatus for successively forming relatively deep circular corrugations in tubes, including an upper mandrel roll having circumferential grooves in planes at right angles to its axis around which the tube is positioned, a lower roll spaced from said upper roll, means for rotating the rolls in opposite directions, means journaling the rolls with their axes in fixed positions when the rolls rotate, a plurality of individual separate corrugation forming die elements for mating with the grooves of the upper roll and pressing the tube wall into said grooves, and means on the lower roll for progressively engaging from one to the other and feeding the die elements each in the plane of a mating groove in the upper roll and between the tube and lower roll as the rolls rotate, for rolling circular corrugations in the tube progressively from one end to the other thereof.

EDMUND W. RIEMENSCHNEIDER.